(12) United States Patent
Uchiyama et al.

(10) Patent No.: US 10,348,746 B2
(45) Date of Patent: Jul. 9, 2019

(54) INCIDENT DETECTION SYSTEM INCLUDING GATEWAY DEVICE AND SERVER

(71) Applicant: Hitachi, Ltd., Chiyoda-ku, Tokyo (JP)

(72) Inventors: Hiroki Uchiyama, Tokyo (JP); Toru Owada, Tokyo (JP); Makoto Kayashima, Tokyo (JP); Yusuke Fujihara, Tokyo (JP); Satoshi Ohkubo, Tokyo (JP); Jun Hamanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/547,905

(22) PCT Filed: Dec. 24, 2015

(86) PCT No.: PCT/JP2015/086065
§ 371 (c)(1),
(2) Date: Aug. 1, 2017

(87) PCT Pub. No.: WO2016/143231
PCT Pub. Date: Sep. 15, 2016

(65) Prior Publication Data
US 2018/0026998 A1    Jan. 25, 2018

(30) Foreign Application Priority Data
Mar. 12, 2015 (JP) ................. 2015-049851

(51) Int. Cl.
*H04L 29/06*  (2006.01)
*H04L 12/26*  (2006.01)

(52) U.S. Cl.
CPC .......... *H04L 63/1416* (2013.01); *H04L 43/06* (2013.01); *H04L 63/0236* (2013.01); *H04L 63/1425* (2013.01)

(58) Field of Classification Search
CPC ............. H04L 63/1416; H04L 63/1425; H04L 63/0236; H04L 43/06; H04L 12/66; H04L 29/06; H04L 12/26
(Continued)

(56) References Cited

U.S. PATENT DOCUMENTS

2004/0010572 A1    1/2004   Watanabe
2009/0160629 A1    6/2009   Shimura
(Continued)

FOREIGN PATENT DOCUMENTS

JP    4-235652 A      8/1992
JP    2003-229913 A   8/2003
(Continued)

OTHER PUBLICATIONS

International Search Report (PCT/ISA/210) issued in PCT Application No. PCT/JP2015/086065 dated Mar. 8, 2016 with English translation (Four (4) pages).
Japanese-language Written Opinion (PCT/ISA/237) issued in PCT Application No. PCT/JP2015/086065 dated Mar. 8, 2016 (Four (4) pages).
(Continued)

*Primary Examiner* — Ashokkumar B Patel
*Assistant Examiner* — Quazi Farooqui
(74) *Attorney, Agent, or Firm* — Crowell & Moring LLP

(57) ABSTRACT

A system that detects any unauthorized communication without imposing a processing load on a control device is provided. In the incident detection system configured to detect any security incident, a gateway device includes: an ID generation unit that generates its own gateway device identification information; a detection packet generation unit that generates a detection packet including control information transmitted from a control device and path information obtained by adding its own gateway device identification information to a communication packet; a log generation (Continued)

unit that generates log information including the detection packet; and a device communication unit that transmits the log information to a management server connected to the gateway device over a network or transmits the detection packet to a control device controlled based on the control information. In the incident detection system, the management server includes: a server communication unit that receives log information from a gateway device; a communication path extraction unit that stores assumed path information, obtained by extracting path information from the log information, in a storage unit in advance; and an incident detection unit that detects any unauthorized communication packet based on the assumed path information stored in the storage unit and path information included in the log information.

12 Claims, 15 Drawing Sheets

(58) Field of Classification Search
USPC .............................................. 726/12; 713/153
See application file for complete search history.

(56) References Cited

U.S. PATENT DOCUMENTS

| 2010/0043068 A1* | 2/2010 | Varadhan ............ H04L 12/4633 |
| | | 726/15 |
| 2012/0030351 A1* | 2/2012 | Fukushima ........... H04L 63/101 |
| | | 709/224 |
| 2012/0030761 A1 | 2/2012 | Baba et al. |

FOREIGN PATENT DOCUMENTS

| JP | 2006-100874 A | 4/2006 |
| JP | 2007-131029 A | 5/2007 |
| JP | 2008-99156 A | 4/2008 |
| JP | 2012-34129 A | 2/2012 |
| JP | 2012-34273 A | 2/2012 |

OTHER PUBLICATIONS

S. Kent, et al., "Security Architecture for the Internet Protocol," Network Working Group RFC 4301, Standards Track, Dec. 2005, The Internet Society, pp. 1-101 (One-hundred and one (101) pages).

* cited by examiner

US 10,348,746 B2

INCIDENT DETECTION SYSTEM INCLUDING GATEWAY DEVICE AND SERVER

TECHNICAL FIELD

The present invention relates to systems that detect incidents, such as cyber attacks, occurring in a control system connected over a network and in particular to a system configured to embed path information in a communication packet within a control system and detect any communication packet having no correct path information as an unauthorized communication packet.

BACKGROUND ART

Control systems utilized in social infrastructures, such as electricity, railroads, waterworks, and gasworks, and automobiles are required to operate devices, such as valves and actuators, based on information from sensors to maintain preset pressures and temperatures. To implement these operations, it is necessary to periodically acquire information from sensors to check status and excise control as required. For this purpose, in a usual control system, processing is periodically performed; and processing performed in each device within the system has to be completed in one cycle. To be completed in one cycle without fail, the processing time of each processing is also required to be constant without varying depending on situations. Existing control systems built to meet these conditions greatly differ in cycle or free time in one cycle depending on the fields of application, such as electricity, railroads, waterworks, and automobiles. To add new processing, it is required to estimate a free time for each field of application and consider the details of processing that can be implemented.

Meanwhile, control systems conventionally utilize a dedicated OS or a dedicated protocol and are installed in isolation in an area inaccessible from such external networks as Internet. For this reason, it used to be believed that the conventional control systems are free from so-called malwares and cyberattacks including DoS attacks. However, cases where a general-purpose OS or a general-purpose protocol is adopted for cost reduction are being increased in number. Further, connection with an information system is increasingly accelerated for the enhancement of efficiency. In recent years, malwares targeted at control systems have been found. Therefore, also for control systems, as well as information systems, technologies have been enquired to detect infection of malware or the like and external unauthorized accesses.

To cope with these problems, various technologies are known. In one of these technologies, patterns (sources addresses destination addresses, protocols, etc.) of communication carried out within a control system and formats of data are listed in advance and any communication that does not match with such a pattern is detected as an unauthorized communication. (Refer to Patent Literature 1, for example.)

Technologies in which authentication data is appended to communication packets and a communication packet having no correct authentication data is identified as an unauthorized communication packet are known. (Refer to Non-patent Literature 1, for example.)

CITATION LIST

Patent Literature

PTL 1: Japanese Patent Application Laid-Open No. 2012-34273

Non-Patent Literature

Non-patent Literature 1: S. Kent, K. Seo, "Security Architecture for the Internet Protocol (RFC4301)," [online], December, 2005, IETF, [Retrieved on Nov. 25, 2014], Internet <URL: https://tools.ietf.org/html/rfc4301>

SUMMARY OF INVENTION

Technical Problem

With respect to control devices forming a control system, it used to be difficult to introduce a security function requiring additional processing, such as encryption and authentication, because of processing time constraints. In technologies in which unauthorized communication packets are detected by listing normal communication patterns, it is necessary to list every communication in advance. Therefore, if there is any dropout or leakage in an operation or the like performed only in emergency, it can lead to erroneous detection. In an environment, such as a control system, in which communication is frequently performed, the number of communication packets to be verified is enormous, a load for verifying these pieces of data becomes very high.

In consideration of the foregoing, the present invention has been made and it is an object of the present invention to provide a system detecting unauthorized communication without imposing a processing load on a control device.

Solution to Problem

To address the above problem and achieve the above object, an incident detection system of the present invention is configured to detect any security incident. In the incident detection system, a gateway device includes: an ID generation unit that generates its own gateway device identification information; a detection packet generation unit that generates a detection packet including control information transmitted from a control device and path information obtained by appending the own gateway device identification information to a communication packet; a log generation unit that generates log information including the detection packet; and a device communication unit that transmits the log information to a management server connected to the gateway device over a network or transmits the detection packet to a control device controlled based on the control information. In the incident detection system, the management server includes: a server communication unit that receives the log information from the gateway device; a communication path extraction unit that stores assumed path information, obtained by extracting the path information from the log information, in a storage unit in advance; and an incident detection unit that detects any unauthorized communication packet based on the assumed path information stored in the storage unit and the path information included in the log information.

An incident detection system of the present invention is configured to detect any security incident. Also in the incident detection system, a first gateway device includes: an ID generation unit that generates its own gateway device identification information; a detection packet generation unit that generates a detection packet including control information transmitted from a control device and path information obtained by appending its own gateway device identification information to a communication packet; a first device communication unit that transmits the detection packet to a second gateway device connected to the first gateway device over a network. In the incident detection system, the second gateway device includes: a second device communication unit that receives the detection packet from the first gateway device or transmits the detection packet to a control device controlled based on the control information; a log generation unit that stores the detection packet in a storage unit as log information; a communication path extraction unit that stores assumed path information, obtained by extracting the path information from the log information, in a storage unit in advance; and an incident detection unit that detects any unauthorized communication packet based on the assumed path information stored in the storage unit and the path information included in the log information.

Advantageous Effects of Invention

According to one aspects of the present invention, unauthorized communication can be detected without imposing a processing load on a control device.

DESCRIPTION OF EMBODIMENTS

A description will be given to an embodiment of the present invention. This is not intended to limit the present invention.

Figure 1:
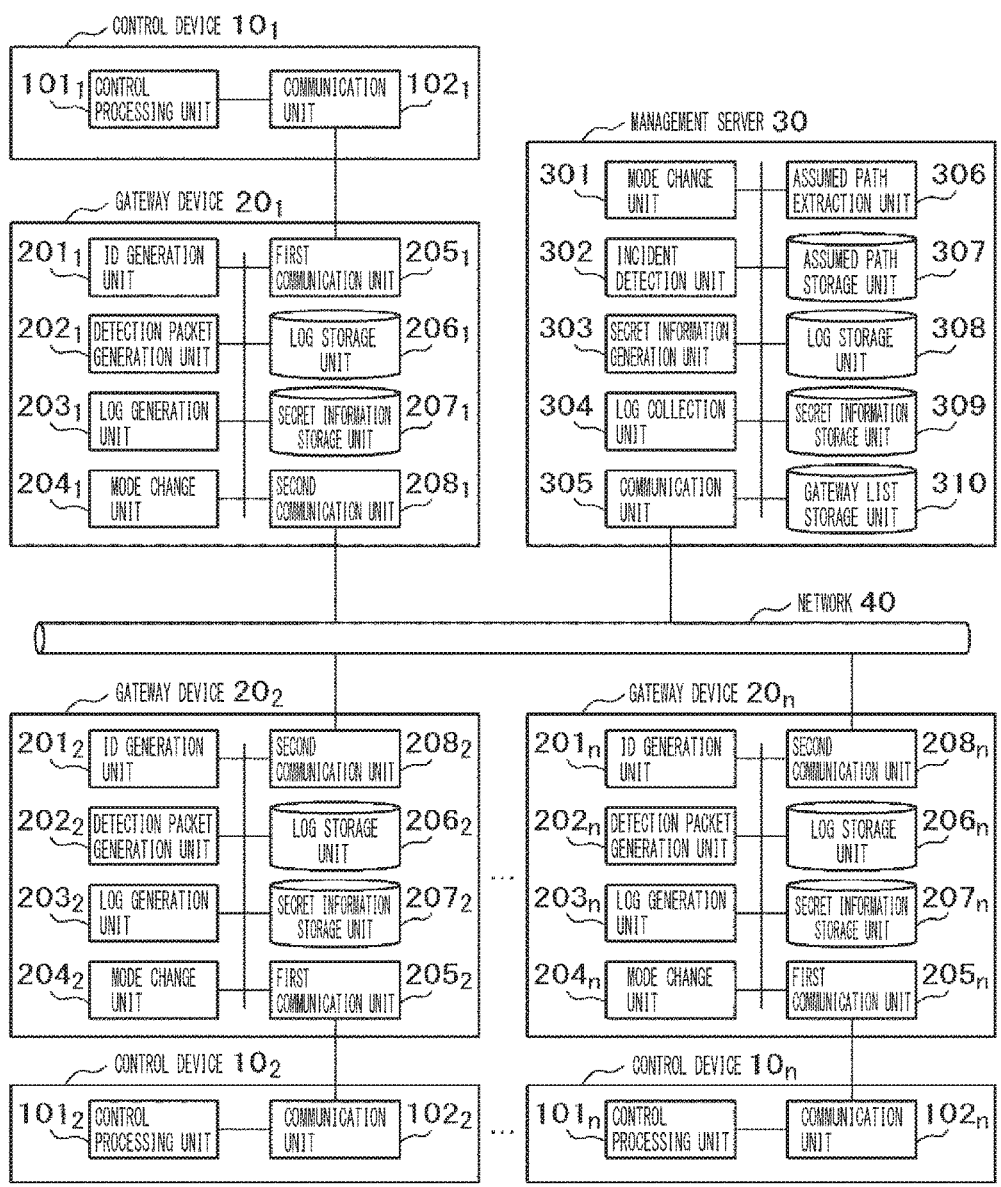
FIG. 1 is a drawing illustrates an exemplary configuration of an incident detection system to which a first embodiment of the present invention is applied.

FIG. 1 is a block diagram of an incident detection system to which a first embodiment of the present invention is applied. As illustrated in FIG. 1 the incident detection system in this embodiment includes control devices $10_1$ to $10_n$, gateway devices $20_1$ to $20_n$, a management server 30, and a network 40.

Each control device $10_1$ to $10_n$ includes: a control processing unit $101_1$ to $101_n$ that performs control processing; and a communication unit $102_1$ to $102_n$ that communicates with a gateway device $20_1$ to $20_n$ and the like.

Each gateway device $20_1$ to $20_n$ includes: an ID generation unit $201_1$ to $201_n$ that generates its own gateway device identification information; a detection packet generation unit $202_1$ to $202_n$ that generates a detection packet by appending its own gateway device identification information to a passing packet; a log generation unit $203_1$ to $203_n$ that generates log information of a passing communication packet; a mode change unit $204_1$ to $204_n$ that changes the operation mode of the gateway device $20_1$ to $20_n$; a first communication unit $205_1$ to $205_n$ that communicates with the control device $10_1$ to the control device $10_n$ and the network 40; a log storage unit $206_1$ to $206_n$ for storing a log generated by the relevant gateway device; a secret information storage unit $207_1$ to $207_n$ for storing secret information required to generate the own gateway device identification information; and a second communication unit $208_1$ to $208_n$ that communicates with the control device $10_1$ to the control device $10_n$ and the network 40.

The management server 30 includes: a mode change unit 301 that changes the operation mode of the management server 30; an incident detection unit 302 that detects incidents from log information collected from the gateway devices $20_1$ to $20_n$; a secret information generation unit 303 that generates secret information to be delivered to the gateway devices $20_1$ to $20_n$; a log collection unit 304 that collects log information from the gateway devices $20_1$ to $20_n$; a communication unit 305 that communicates with the network 40; an assumed path extraction unit 306 that extracts assumed paths from log information collected from the gateway devices $20_1$ to $20_n$; an assumed path storage unit 307 for storing extracted assumed paths; an integrated log storage unit 308 that integrates and stores log information collected from the gateway devices $20_1$ to $20_n$; a secret information storage unit 309 for storing generated secret information; a gateway list storage unit 310 for storing a list of the gateway devices $20_1$ to $20_n$. In the following description, the assumed path extraction unit 306 extracts assumed paths from log information collected by the log collection unit 304. Instead, the assumed path extraction unit 306 may directly collect log information.

Figure 2:
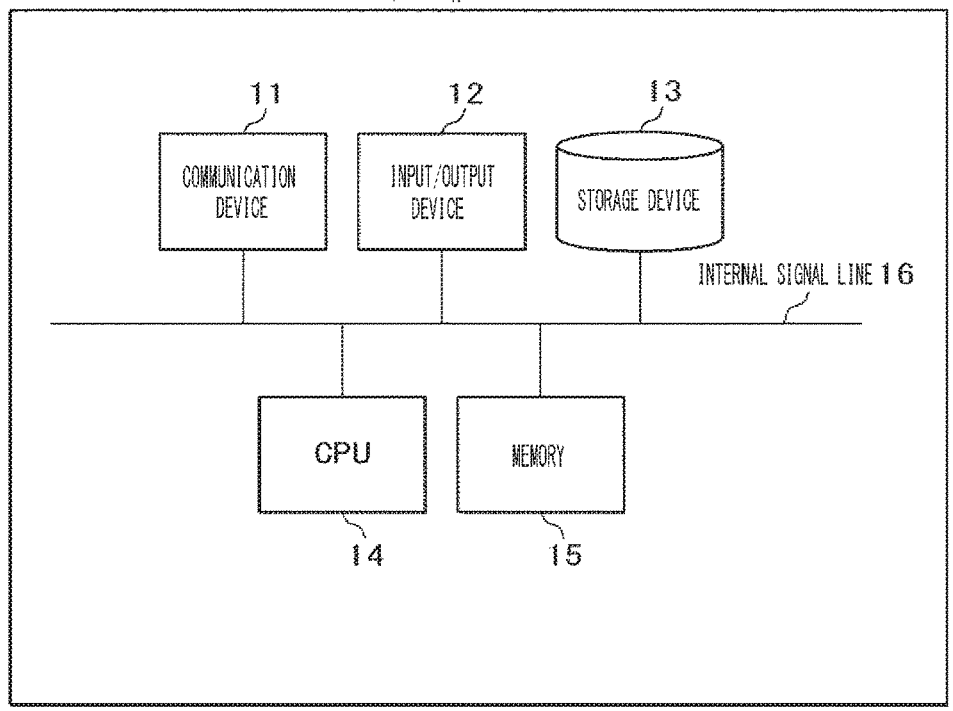
FIG. 2 is a drawing illustrating an exemplary hardware configuration of a control device shown in FIG. 1

FIG. 2 illustrates an exemplary hardware configuration of each control device $10_1$ to $10_n$. Each control device $10_1$ to $10_n$ is constructed by coupling a communication device 11, an input/output device 12, a storage device 13, CPU 14, and a memory 15 through such an internal communication line 16 as a bus.

Figure 3:
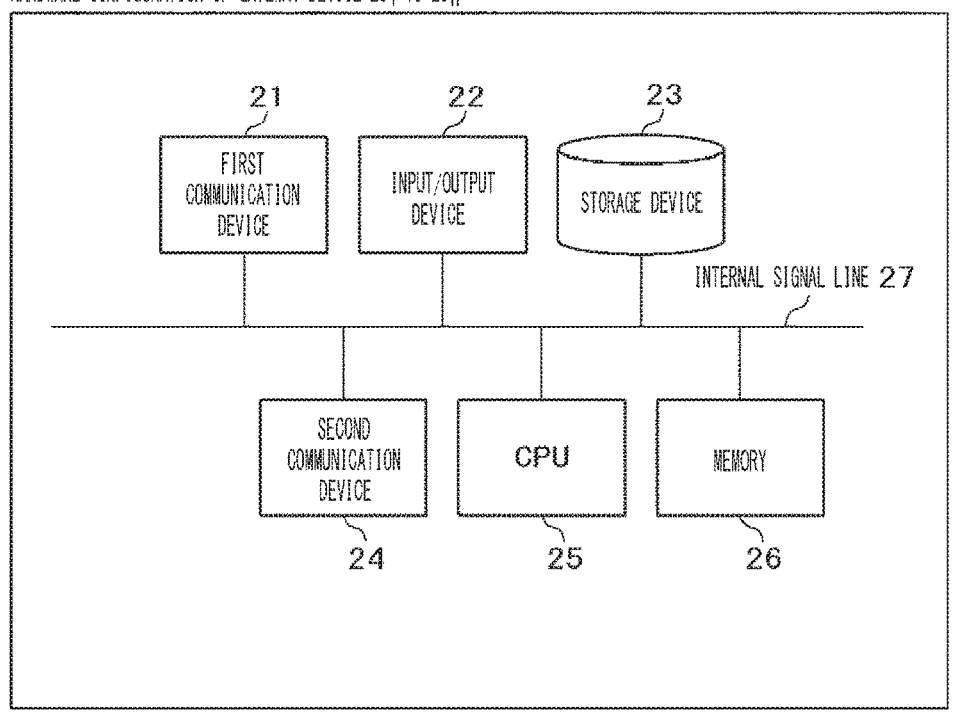
FIG. 3 is a drawing illustrating an exemplary hardware configuration of a gateway device shown in FIG. 1

FIG. 3 illustrates an exemplary hardware configuration of each gateway device $20_1$ to $20_n$. Each gateway device $20_1$ to $20_n$ is constructed by coupling a first communication device 21, an input/output device 22, a storage device 23, a second communication device 24, CPU 25, and a memory 26 through such an internal communication line 27 as a bus.

Figure 4:
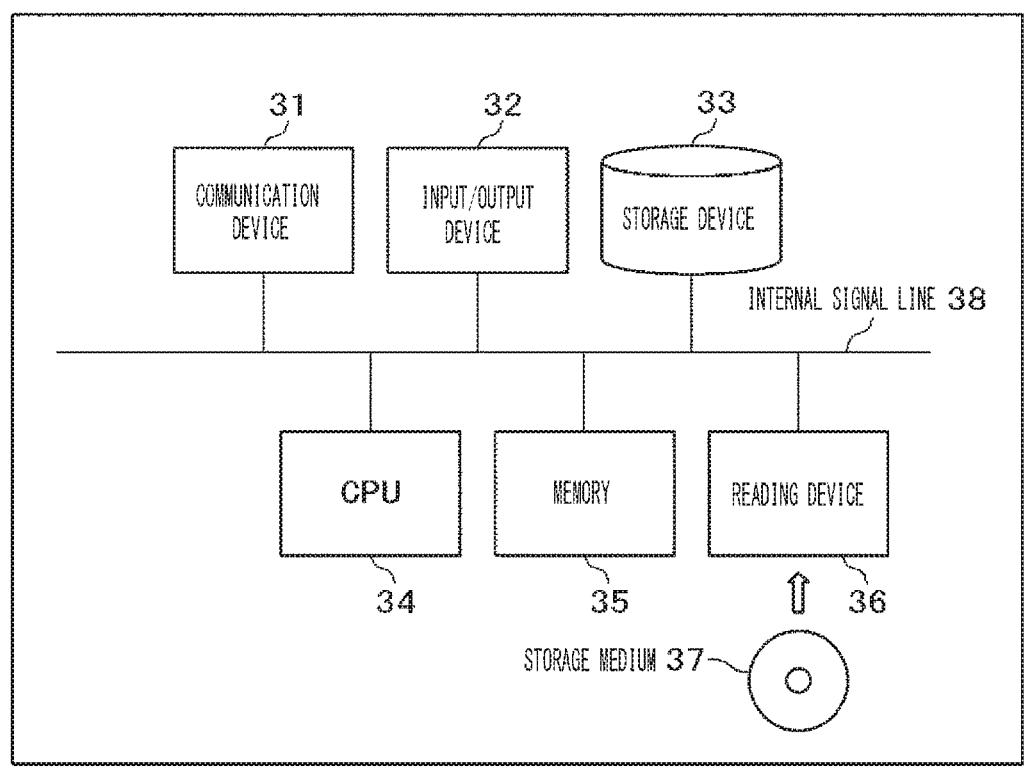
FIG. 4 is a drawing illustrating an exemplary hardware configuration of the management server shown in FIG. 1

FIG. 4 illustrates an exemplary hardware configuration of the management server 30. The management server 30 is constructed by coupling a communication device 31, an input/output device 32, a storage device 33, CPU 34, a memory 35, and a reading device 36 reading a storage medium 37 through such an internal communication line 38 as a bus.

A description will be given to a flow of processing carried out in an incident detection system in this embodiment. The following flow of processing is carried out by each processing unit embodied in each device forming the incident detection system. The flow of processing is carried out by a program stored in the storage devices of the control devices $10_1$ to $10_n$, the gateway devices $20_1$ to $20_n$, and the management server 30 being loaded to a memory and executed by CPU. Each program may be stored in a storage device in advance or may be loaded as required through any other storage medium or a communication medium (a network or a carrier wave propagated over a network).

Figure 5:
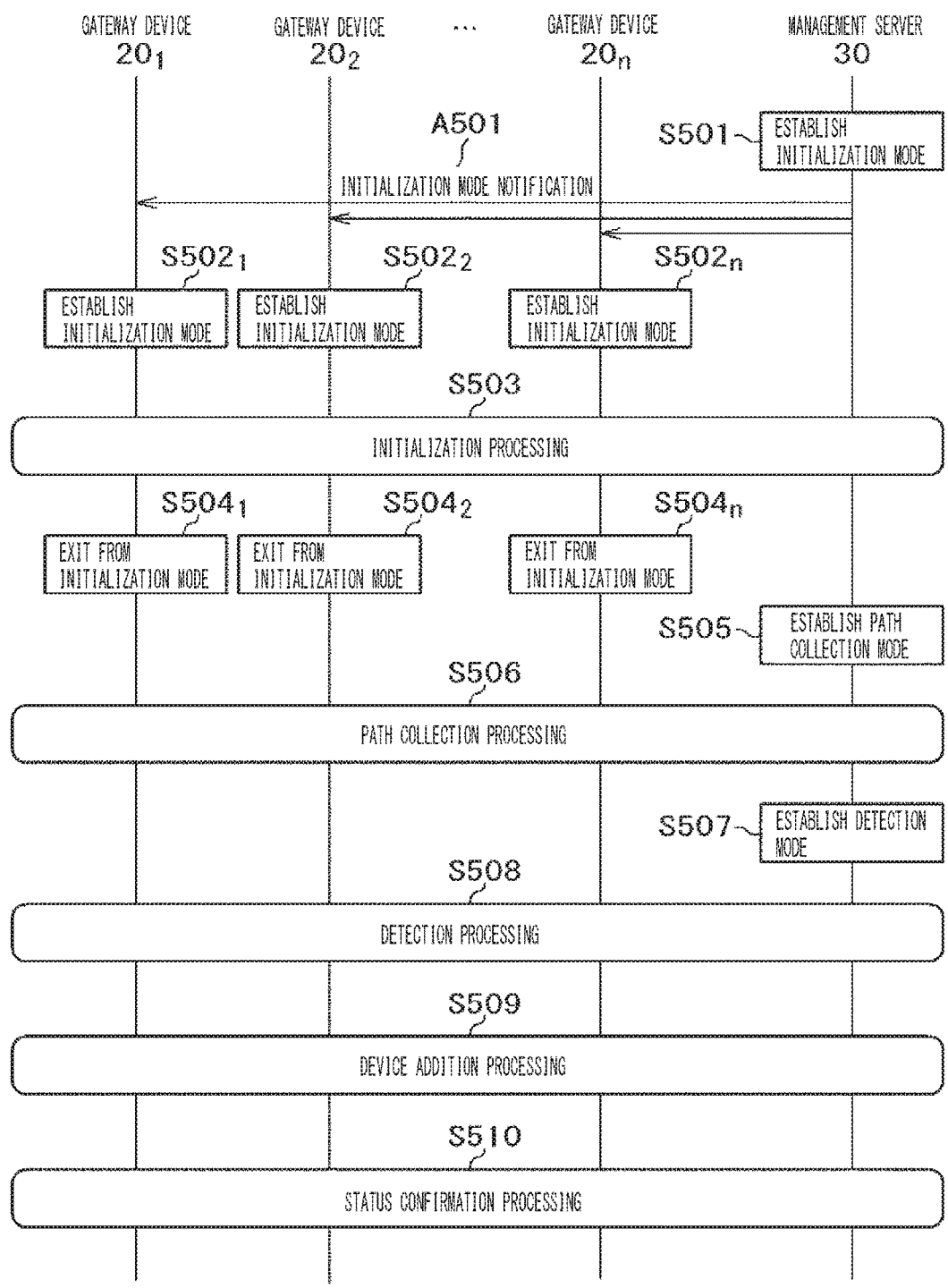
FIG. 5 is a drawing illustrating an example of a flow of processing carried out in an incident detection system to which the first embodiment of the present invention is applied during a trial run or during operation.

FIG. 5 illustrates a flow of processing carried out in an incident detection system to which the first embodiment of the present invention is applied during a trial run or during operation.

First, in a trial run, the mode change unit 301 of the management server 30 sets the operation mode of the management server to an initialization mode, a mode for preparation for processing (S501 (expressed as S501. This is the same with the following description)). Subsequently, the communication unit 305 transmits an initialization mode notification (A501) indicating establishment of an initialization mode to each gateway device $20_1$ to $20_n$.

Subsequently the mode change unit $204_1$ to $204_n$ of each gateway device $20_1$ to $20_n$ establishes an initialization mode based on the received initialization mode notification (A501) (S502).

Subsequently, initialization processing is carried out between each gateway device $20_1$ to $20_n$ and the management server (S503). The details of initialization processing will be described with reference to FIG. 6.

After the completion of initialization processing, the mode change unit $204_1$ to $204_n$ of each gateway device $20_1$ to $20_n$ exits from the initialization mode (S504).

Subsequently, the mode change unit 301 of the management server 30 sets the operation mode of the management server 30 to a path collection mode, a mode for collecting assumed paths (S505).

Subsequently, path collection processing is carried out between each gateway device $20_1$ to $20_n$ and the management server (S506). The details of path collection processing will be described with reference to FIG. 7.

After the completion of path collection processing, during operation, the mode change unit 301 of the management server 30 sets the operation mode of the management server 30 to a detection mode, a mode for detecting the path of a communication packet (S507).

Subsequently, detection processing is carried out between each gateway device $20_1$ to $20_n$ and the management server 30 (S508). The details of detection processing will be described with reference to FIG. 8.

When a new gateway device is added to the system, device addition processing is carried out between each gateway device $20_1$ to $20_n$ and the management server 30 (S509). The details of device addition processing will be described with reference to FIG. 10.

When a gateway device is removed from the system, periodically, or at any time, status confirmation processing is carried out between each gateway device 201 to 20n and the management server 30 (S510). The details of status confirmation processing will be described with reference to FIG. 11.

Figure 6:
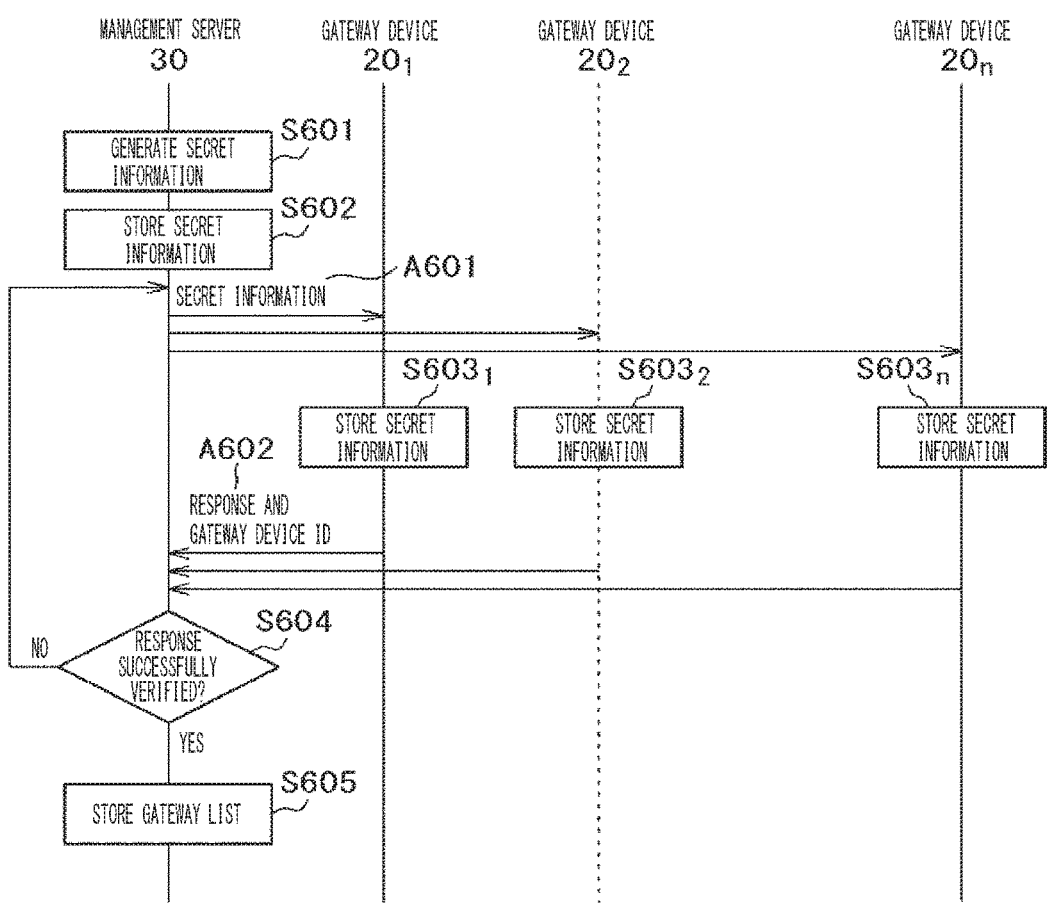
FIG. 6 is a drawing illustrating an example of a flow of processing carried out to distribute secret information to each gateway device and collect identification information during a trial run in an incident detection system to which the first embodiment of the present invention is applied.

FIG. 6 illustrates a flow of processing to distribute secret information to each gateway device and collect identification information during a trial run in an incident detection system to which the first embodiment of the present invention is applied.

First, the secret information generation unit 303 of the management server 30 generates secret information to be distributed to each gateway device (S601). The secret information cited here is encrypted information and may be generated by encryption operation, may be generated using a pseudo random number or a genuine random number, or may be generated by an external input. Subsequently, the secret information generation unit 303 stores the generated secret information (S602). Subsequently, the communication unit 305 delivers the generated secret information (A601) to each gateway device $20_1$ to $20_n$.

Subsequently, the ID generation unit $201_1$ to $201_n$ of a gateway device $20_1$ to $20_n$ that received the secret information stores the secret information ($S603_1$ to $S603_n$). Subsequently, the second communication units $208_1$ to $208_n$ transmit a response including the result of storage of the secret information and the respective gateway device identification information (A602) to the management server 30.

Subsequently, the secret information generation unit 303 of the management server 30 verifies the received response (S604) to check whether the secret information has been properly delivered to each gateway device. When the result of verification reveals that the secret information has not been properly delivered, the information is sent again to the relevant gateway device. When it is determined that the secret information has been properly delivered, the received gateway device identification information is stored as a gateway list (S605). To verify a response is, for example, to confirm the presence or absence of a reply when a ping command is executed.

Figure 7:
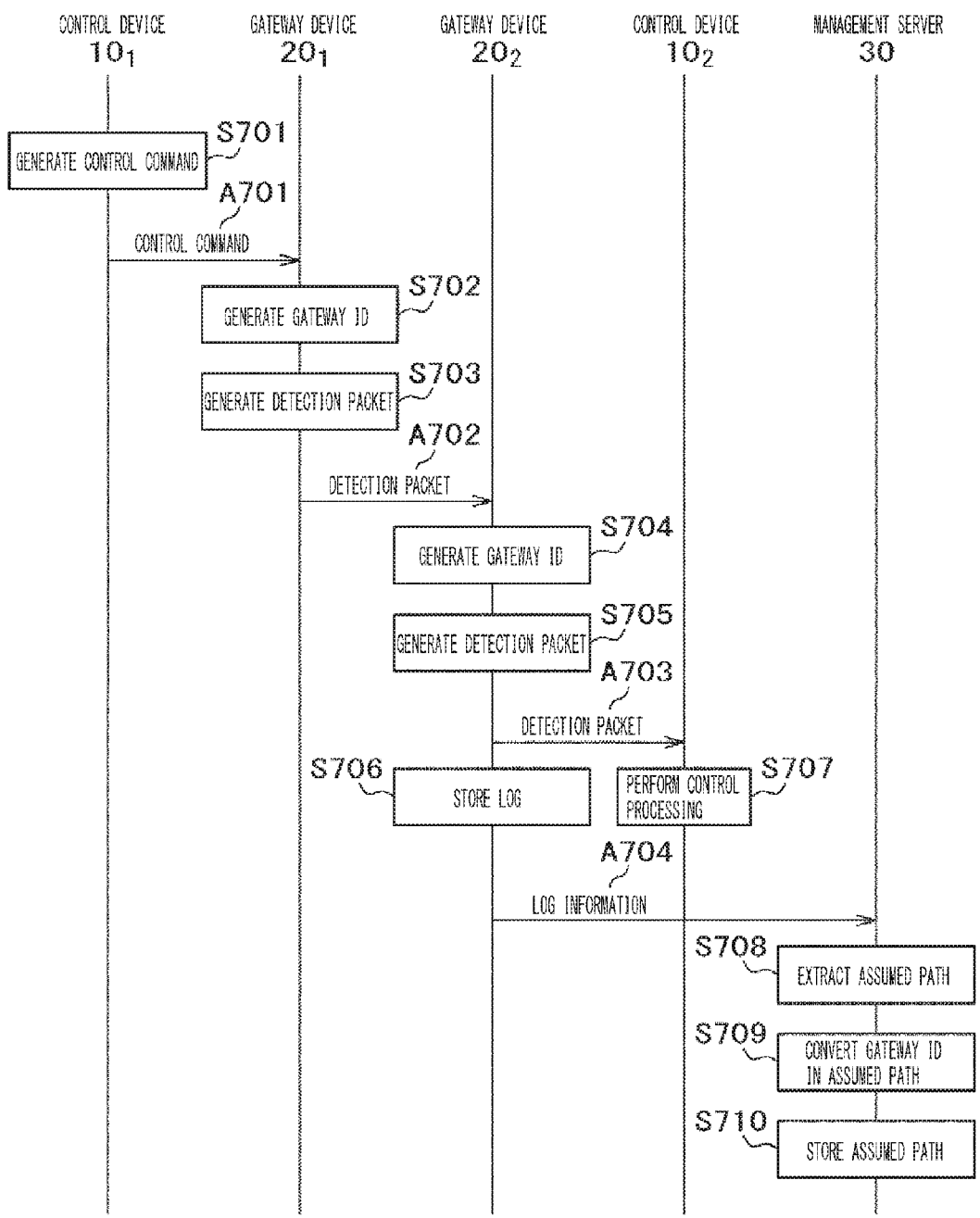
FIG. 7 is a drawing illustrating an example of a flow of processing carried out to collect the path information of authorized communication packets from each gateway device during a trial run in an incident detection system to which the first embodiment of the present invention is applied.

FIG. 7 illustrates a flow of processing to collect the path information of authorized communication packets from each gateway device during a trial run in an incident detection system to which the first embodiment of the present invention is applied. In this exemplary flow, a control command is transmitted from the control device $10_1$ as an origin of control to the control device $10_2$ as a target of control.

First, the control processing unit $101_1$ of the control device $10_1$ generates a control command (S701). Subsequently, the communication unit $102_1$ transmits the generated control command (A701) to the control device $10_2$.

Subsequently, the first communication unit $205_1$ of the gateway device $20_1$ connected to the communication unit $102_1$ of the control device $10_1$ receives the control command (A701) transmitted from the control device $10_1$. Subsequently, the ID generation unit $201_1$ of the gateway device $20_1$ generates identification information of the gateway device $20_1$ as its own gateway device (S702). This identification information may be generated by combining fixed identification information supplied to the gateway device $20_1$ in advance with secret information stored in the secret information storage unit $207_1$ and time information each time processing is performed. Or, the identification information may be generated by combining fixed identification information with time information each time processing is performed. Subsequently, the detection packet generation unit $202_1$ adds a generated gateway ID to the received control command each time to generate a detection packet (A702) (S703). Subsequently, the second communication unit $208_1$ transmits the generated detection packet (A702) to the control device $10_2$. The format of the detection packet will be described with reference to FIG. 12.

Subsequently, the gateway device $20_2$ connected to the communication unit $102_2$ of the control device $10_2$ receives the detection packet (A702) addressed to the control device $10_2$. Subsequently, the ID generation unit $201_2$ of the gateway device $20_2$ generates identification information of the gateway device $20_2$ as its own gateway device (S704). This identification information can be generated by the same method as at S702. Subsequently, the detection packet generation unit $202_2$ adds the generated gateway ID to the received control command each time to generate a detection packet (A703) (S705). Subsequently, the first communication unit $205_2$ transmits the generated detection packet (A703) to the control device $10_2$. The format of this detection packet will be described with reference to FIG. 12 Subsequently, the log generation unit $203_2$ stores the generated detection packet as log information (S706) and the second communication unit $208_2$ transmits the log information (A704) to the management server 30. The format of this log information will be described with reference to FIG. 14

Subsequently, the control processing unit $101_2$ of the control device $10_2$ performs control processing based on the received detection packet (A703) (S707).

Subsequently, the assumed path extraction unit 306 of the management server 30 extracts an assumed path that is correct path information from the received log information (A704) (S708). Subsequently, the assumed path extraction unit 306 converts each gateway ID included in the extracted assumed path into the gateway device identification information stored at S605 (S709) and stores the path information converted into the identification information (S710). The conversion at S709 can be carried out by referring to secret information shared in advance, time information in log information, and fixed identification information of a gateway device and calculating fixed identification information of the relevant gateway device.

Figure 8:
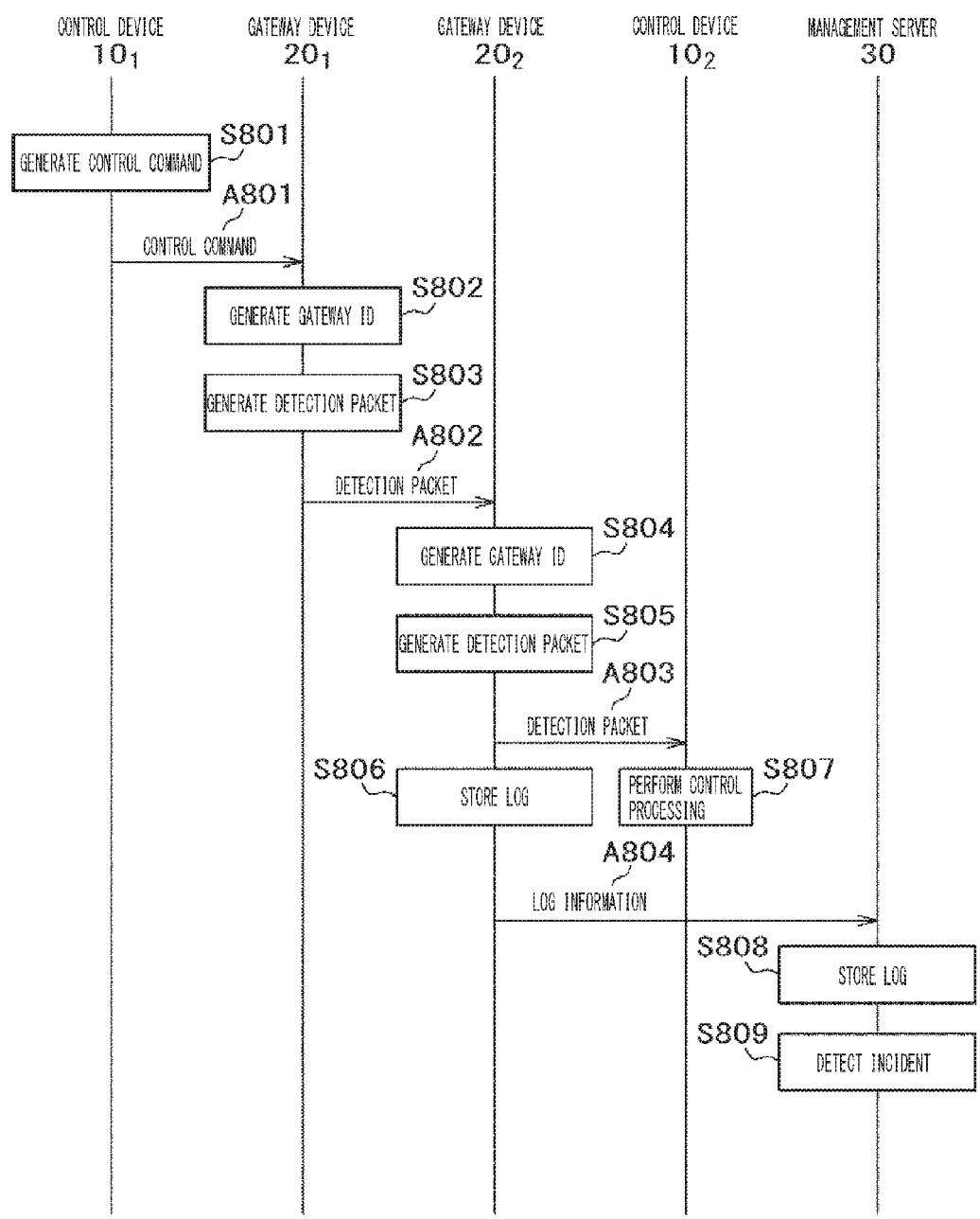
FIG. 8 is a drawing illustrating an example of a flow of processing to detect any unauthorized communication packet from the path information of communication packets collected from each gateway device during operation in an incident detection system to which the first embodiment of the present invention is applied.

FIG. 8 illustrates a flow of processing to detect an unauthorized communication packet from the path information of communication packets collected from each gateway device during operation in an incident detection system to which the first embodiment of the present invention is applied. The illustration is presented as an example of a security incident. In this exemplary flow, a control command is transmitted from the control device $10_1$ as an origin of control to the control device $10_2$ as a target of control. Each processing of S801 to S807 is the same as the processing of S701 to S707 shown in FIG. 7 except processing execution timing. Therefore, the description thereof will be hereafter omitted and each processing of S808 and the following step will be described.

At S806, log information need not be transmitted each time and log information may be collectively transmitted to the management server after some amount of information has been accumulated.

When the control device $10_2$ performs control processing based on the received detection packet (A803) at S807, the log information collection unit 304 of the management server 30 adds the identifier of the gateway device as the source address to the received log information (A804) and stores the log information (S808). In the example shown in FIG. 8 the identifier of the gateway device as the source address is equivalent to the identifier of the gateway device $20_2$. The reason why the identifier of the gateway device as the source address is added is to grasp a gateway device from which log information has been transmitted. Subsequently, the incident detection unit 302 performs incident detection based on the stored log information (S809). The flow of this incident detection processing will be described in detail with reference to FIG. 9 Incident detection need not be performed each time and incident detection may be collectively performed after some amount of log information has been accumulated.

Figure 9:
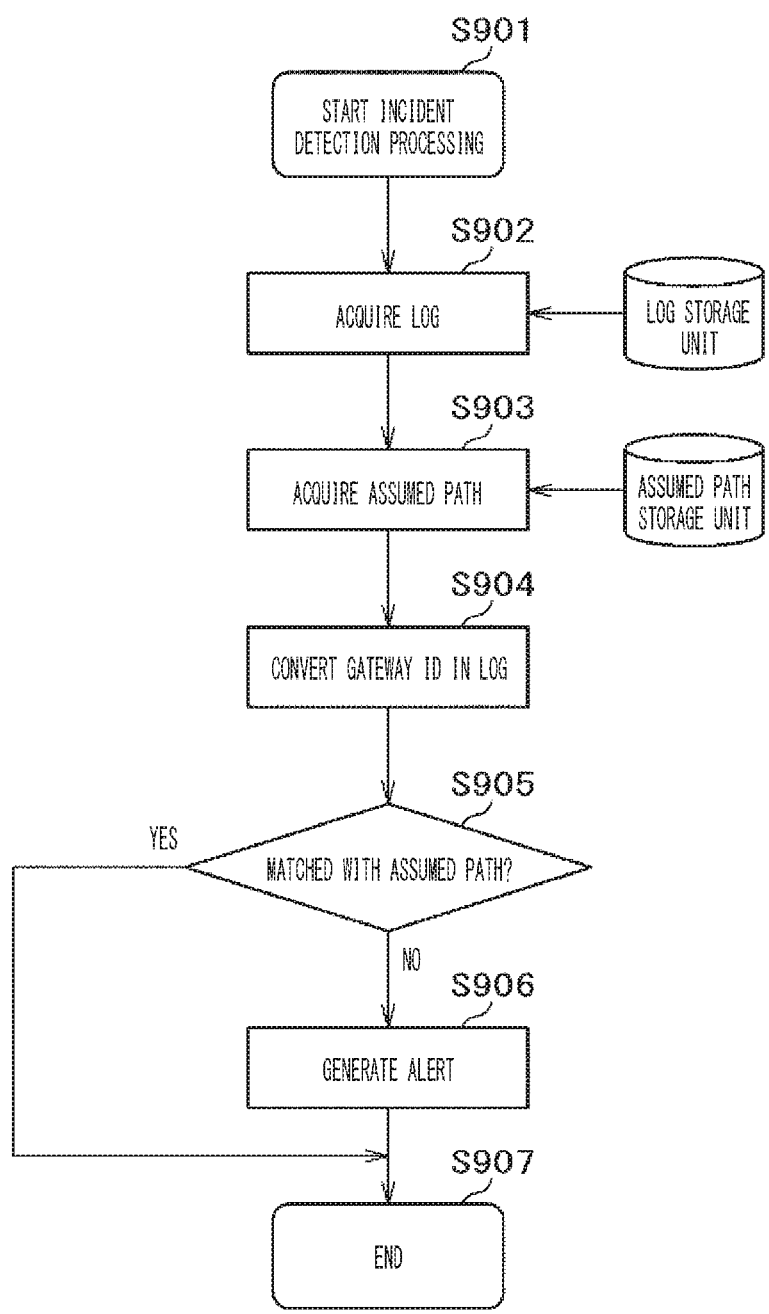
FIG. 9 is a drawing illustrating an example of a flow of processing for incident detection carried out in a management server during operation in an incident detection system to which the first embodiment of the present invention is applied.

FIG. 9 illustrates a flow of incident detection processing carried out in a management server during operation in an incident detection system to which the first embodiment of the present invention is applied.

First, the incident detection unit 302 of the management server 30 starts incident detection processing (S901). Subsequently, the incident detection unit 302 acquires log information accumulated in the log storage unit 308 of the management server 30 (S902). Subsequently, the incident detection unit 302 acquires assumed paths stored in the assumed path storage unit 307 of the management server 30 (S903). Subsequently, similarly to the case of S709 shown in FIG. 7 the incident detection unit 302 converts the identification information of a gateway device in the acquired log information into fixed identification information (S904). Subsequently, the incident detection unit 302 compares the log information with the assumed path (S905). This comparison may be made by verifying whether the assumed path shown in FIG. 16 completely agrees with the log information. Or, the comparison may be made by verifying whether only an assumed path in path information agrees with path information in log information. When the result of comparison reveals that the path information of all the packets agrees with assumed paths, it is determined that the relevant communication packet is an authorized communication packet and the processing is terminated (S907). When a packet whose path information disagrees with an assumed path is detected, the incident detection unit 302 determines that the relevant communication packet is an unauthorized communication packet that has passed through a communication path other than assumed communication paths and generates an alert indicating that (S906).

Figure 10:
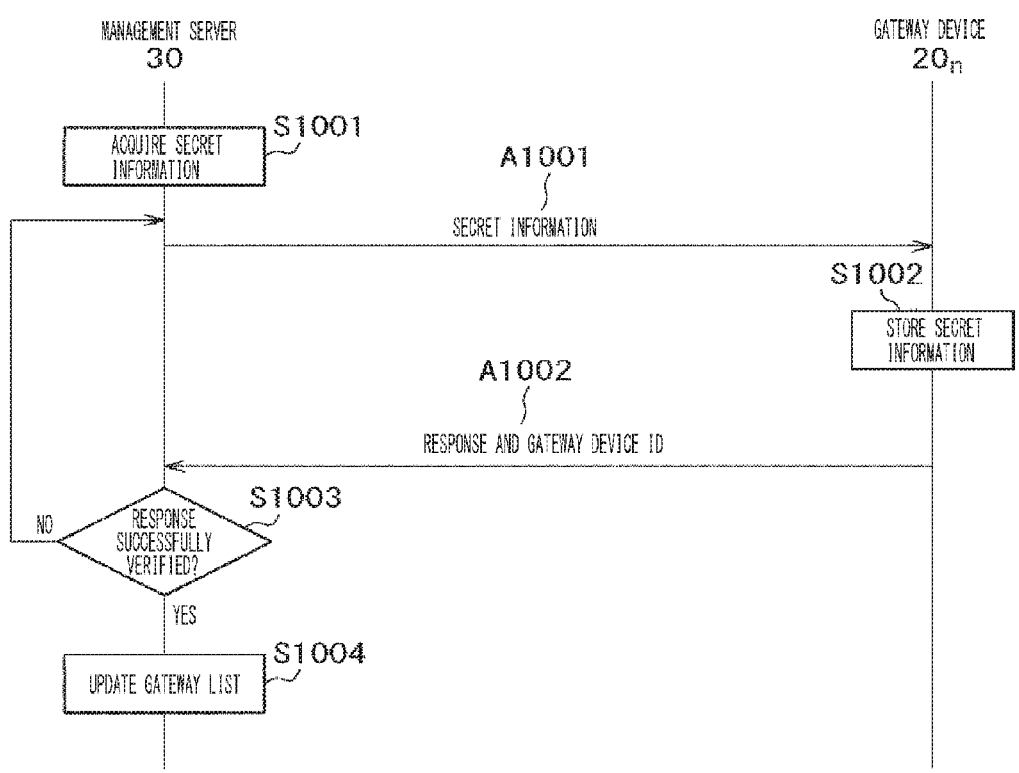
FIG. 10 is a drawing illustrating an example of a flow of processing to add a new gateway device after commissioning in an incident detection system to which the first embodiment of the present invention is applied.

FIG. 10 illustrates a flow of processing carried out when a new gateway device is added after commissioning in an incident detection system to which the first embodiment of the present invention is applied.

First, the secret information generation unit 303 of the management server 30 acquires secret information stored in the secret information storage unit 309 (S1001). Subsequently, the communication unit 305 transmits the acquired secret information (A1001) to the new gateway device $20_n$.

Subsequently, the ID generation unit $201_n$ of the new gateway device $20_n$ stores the received secret information (A1001) in the secret information storage unit $206_n$ (S1002). Subsequently, the second communication unit $208_n$ transmits a response including the result of storage of the secret information and identification information of the new gateway device (A1002) to the management server 30.

Subsequently, the secret information generation unit 303 of the management server 30 verifies the received response (S1003) to check whether the secret information has been properly delivered to the new gateway device $20_n$. When the result of verification reveals that the secret information has not been properly delivered, the information is sent again to the relevant gateway device. When it is determined that the secret information has been properly delivered, the received identification information of the new gateway device $20_n$ is added to the gateway list and the gateway list is updated (S1004).

Figure 11:
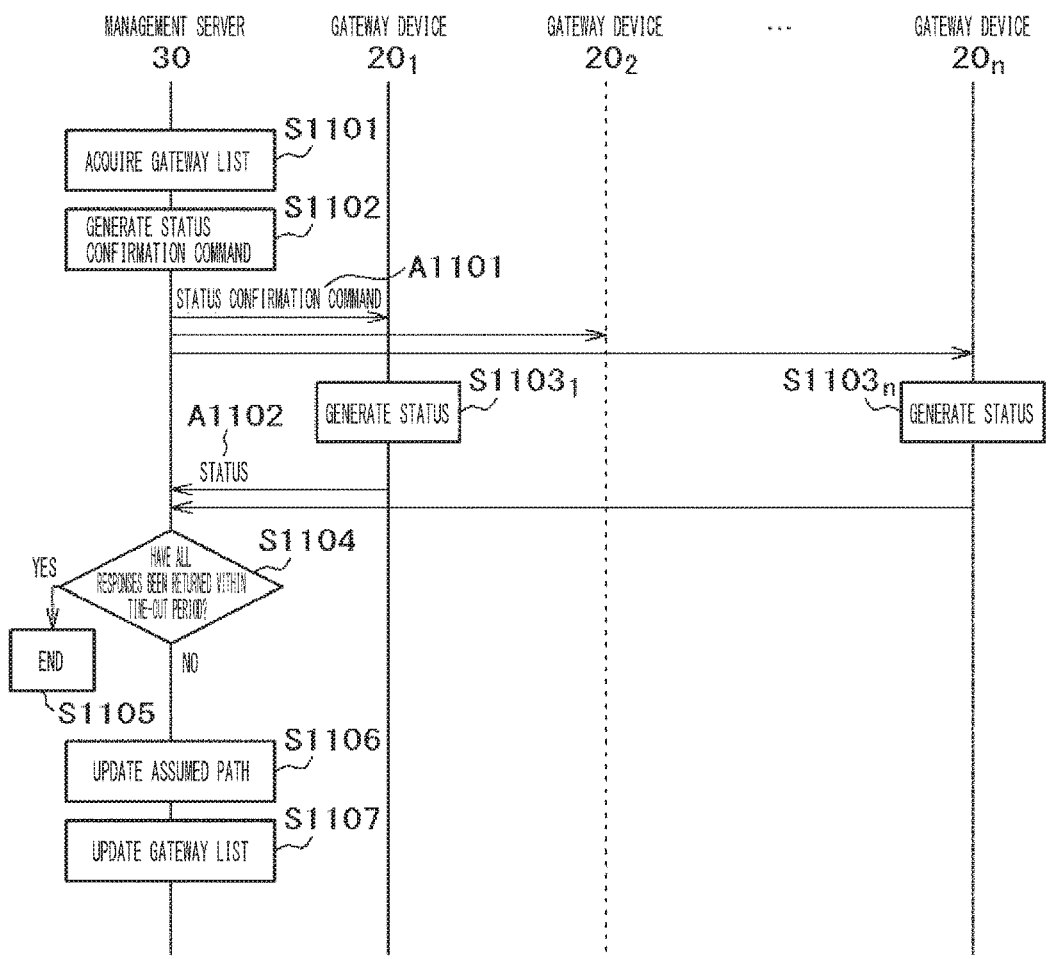
FIG. 11 is a drawing illustrating an example of a flow of processing to verify the status of a gateway device after commissioning in an incident detection system to which the first embodiment of the present invention is applied.

FIG. 11 illustrates a flow of processing to confirm the status of gateway devices after commissioning in an incident detection system to which the first embodiment of the present invention is applied. In this example, the gateway device $20_2$ is removed from the system.

First, the secret information generation unit 303 of the management server 30 acquires a gateway list (S1101). Subsequently, the secret information generation unit 303 generates a command (status confirmation command) to confirm the status of gateway devices (S1102). Subsequently, the communication unit 305 transmits the generated status confirmation command (A1101) to each gateway device $20_1$ to $20_n$ in the system.

Subsequently, the ID generation unit $201_1$ to $201_n$ of each gateway device $20_1$ to $20_n$ (except the gateway device $20_2$) generates status information based on the received status confirmation command (A1101) ($S1103_1$ to $S1103_n$). Since the ID generation unit $201_2$ of the removed gateway device $20_2$ has been already absent in the system, its status information is not generated. Subsequently, the second communication unit $208_1$ to $208_n$ of each gateway device $20_1$ to $20_n$ (except the gateway device $20_2$) transmits the generated status information (A1102) to the management server 30. The status information cited here is information indicating whether each gateway device is capable of communication and, for example, information indicating a replay to a ping command.

Subsequently, the secret information generation unit 303 of the management server 30 determines whether there is any device from which a response has not been acquired within a certain time (S1104). This determination is made based on the received status information (A1102) and each gateway list. When it is determined as a result that a response has been sent back from all the gateway devices within the certain time, the processing is terminated (S1105). When it is determined that a response has not been sent back from all the gateway devices within the certain time, all the path information including that of a gateway device that has not sent back a response is deleted from the path information stored in the assumed path storage unit 307 (S1106). Then, the gateway device that has not sent back a response is deleted from the gateway list and the gateway list is updated such that only devices that have sent back a response are included (S1107).

Figure 12:
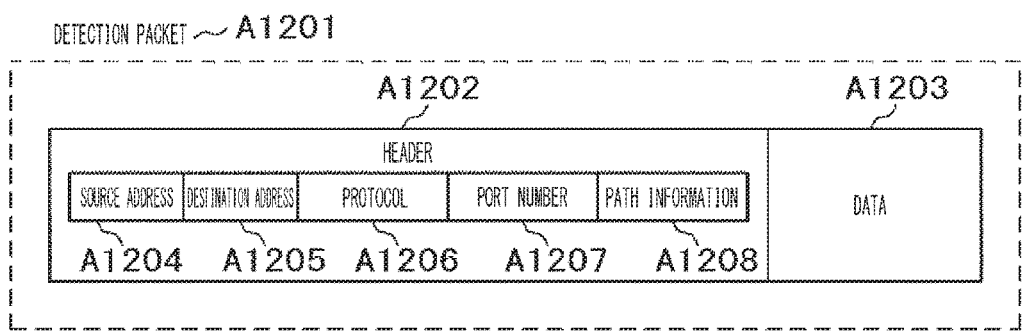
FIG. 12 is a drawing illustrating an exemplary configuration of a detection packet generated by each gateway device in an incident detection system to which the first embodiment of the present invention is applied.

FIG. 12 illustrates an exemplary configuration of a detection packet generated by each gateway device $20_1$ to $20_n$ in an incident detection system to which the first embodiment of the present invention is applied.

The detection packet (A1201) includes a header (A1202) and data (A1203). The header cited here includes the identification information (A1204) of a source address, the identification information (A1205) of a destination address, a communication protocol (A1206), a port number (A1207), and the path information (A1208) of the packet. The location of storage of the path information (A1208) may be fixed or may be varied from packet to packet. When the location of storage is varied, it is advisable to ensure that the location of storage of the path information (A1208) can be recognized in the management server 30. To do this, the location of storage may be shared in advance in the management server 30 at the relevant time or identification information indicating the start point of the path information may be specified. The configuration of the path information (A1208) will be described in detail with reference to FIG. 13 The constituent elements of the detection packet (A1201) are not limited to the foregoing and at least the above-mentioned elements only have to be included. The order of the constituent elements of the detection packet (A1201) is not limited to the foregoing.

Figure 13:
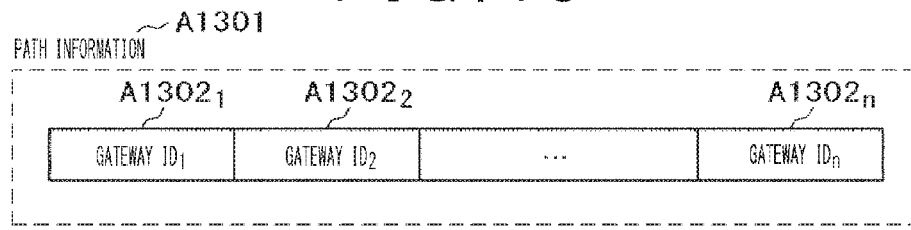
FIG. 13 is a drawing illustrating an exemplary configuration of path information included in a detection packet in an incident detection system to which the first embodiment of the present invention is applied.

FIG. 13 illustrates an exemplary configuration of path information included in a detection packet (A1201) in an incident detection system to which the first embodiment of the present invention is applied.

The path information (A1301) includes identification information ($A1302_1$ to $A1302_n$) of gateway devices through which a communication packet passed. The order of configuration indicates the order of paths through which the communication packet passed. The constituent elements of the path information (A1301) are not limited to the foregoing and at least the above-mentioned elements only have to be included.

Figure 14:
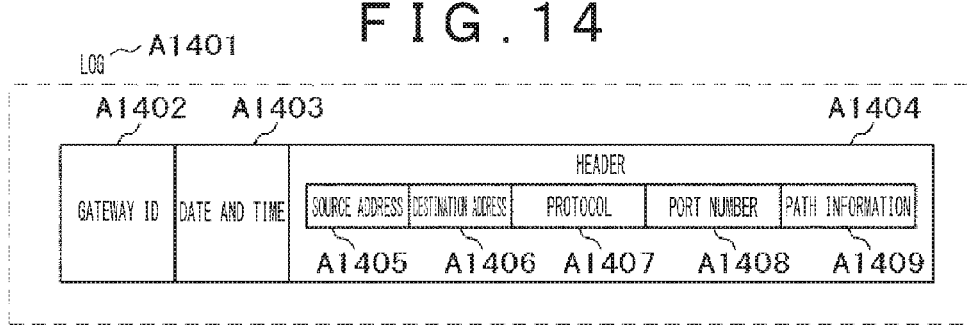
FIG. 14 is a drawing illustrating an exemplary configuration of a log generated by each gateway device in an incident detection system to which the first embodiment of the present invention is applied.

FIG. 14 illustrates an exemplary configuration of log information generated by each gateway device $20_1$ to $20_n$ in an incident detection system to which the first embodiment of the present invention is applied.

The log information (A1401) includes the identification information (A1402) of a gateway device that generated the log information, a date and time (A1403) at which the log information was generated, and the header (A1404) of the communication packet. In this example, the header (A1404) includes the identification information (A1405) of the source address, the identification information (A1406) of the destination address, a communication protocol (A1407), a port number (A1408), and the path information (A1409) of the packet. The constituent elements of the log (A1401) are not limited to the foregoing and at least the above-mentioned elements only have to be included. The order of the constituent elements of the log information (A1401) is not limited to the foregoing.

Figure 15:
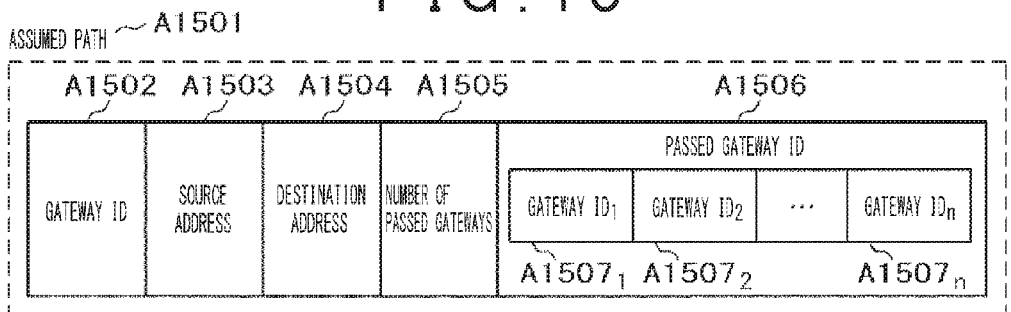
FIG. 15 is a drawing illustrating an exemplary configuration of an assumed path stored in a management server in an incident detection system to which the first embodiment of the present invention is applied.

FIG. 15 illustrates an exemplary configuration of an assumed path stored in a management server 30 in an incident detection system to which the first embodiment of the present invention is applied.

The assumed path (A1501) includes the identification information (A1502) of a gateway device that generated the log information, the identification information (A1503) of a source address of the authorized communication packet, the identification information (A1504) of a destination address thereof, a number of passed gateway devices (A1505), and the identification information (A1506) of the passed gateway devices. In this example, the identification information (A1506) of the passed gateway devices includes the order in which the identification information ($A1507_1$ to $A1507_n$) of the gateway devices passed by authorized communication packets. The constituent elements of the assumed path (A1501) are not limited to the foregoing and at least the above-mentioned elements only have to be included. The order of the constituent elements of the assumed path (A1501) is not limited to the foregoing except the identification information of passed gateway devices.

Figure 16:
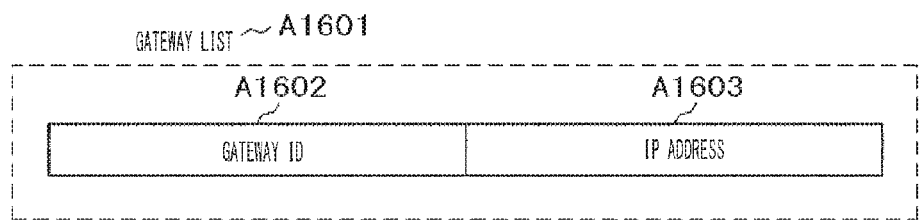
FIG. 16 is a drawing illustrating an exemplary configuration of a gateway list stored in a management server in an incident detection system to which the first embodiment of the present invention is applied.

FIG. 16 illustrates an exemplary configuration of a gateway list stored in a management server 30 in an incident detection system to which the first embodiment of the present invention is applied.

The gateway list (A1601) includes the identification information (A1602) and an IP address of a gateway device (A1603). The constituent elements of the gateway list (A1601) are not limited to the foregoing and at least the above-mentioned elements only have to be included. The order of the constituent elements of the gateway list (A1601) is not limited to the foregoing.

Figure 17:
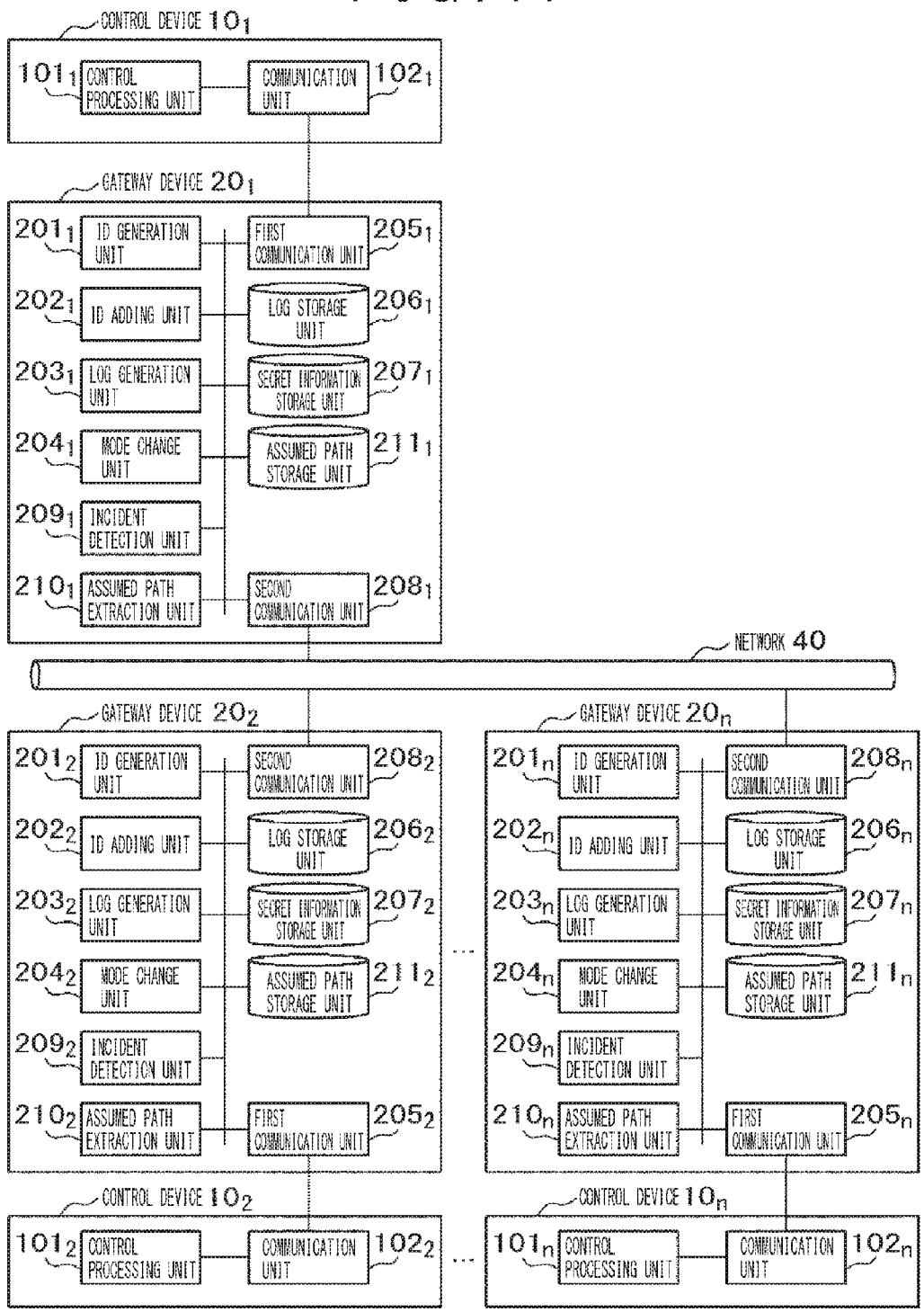
FIG. 17 is a drawing illustrating an exemplary configuration of an incident detection system to which a second embodiment of the present invention is applied.

FIG. 17 is a block diagram of an incident detection system to which a second embodiment of the present invention is applied.

As illustrated in FIG. 17 the incident detection system in this embodiment includes control devices $10_1$ to $10_n$, gateway devices $20_1$ to $20_n$, and a network 40.

The constituent elements of each control device $10_1$ to $10_n$ are the same as in FIG. 1 The constituent elements of each gateway device $20_1$ to $20_n$ includes, in addition to the constituent elements shown in FIG. 1 an incident detection unit $209_1$ to $209_n$ that detects an incident from collected log information; an assumed path extraction unit $210_1$ to $210_n$ that extracts an assumed path from collected log information; and an assumed path storage unit $211_1$ to $211_n$ for storing extracted assumed paths. When secret information is generated in this embodiment, the ID generation units may be provided with the same functions as those of the secret information generation units in the first embodiment. A description will be given to a flow of processing carried out in an incident detection system in this embodiment. The following flow of processing is carried out by each processing unit embodied in each device forming the incident detection system. The flow of processing is carried out by a program stored in the storage devices of the control devices $10_1$ to $10_n$ and the gateway devices $20_1$ to $20_n$ being loaded into a memory and executed by CPU. Each program may be stored in a storage device in advance or may be loaded as required through any other storage medium or a communication medium (a network or a carrier wave propagated over a network).

Figure 18:
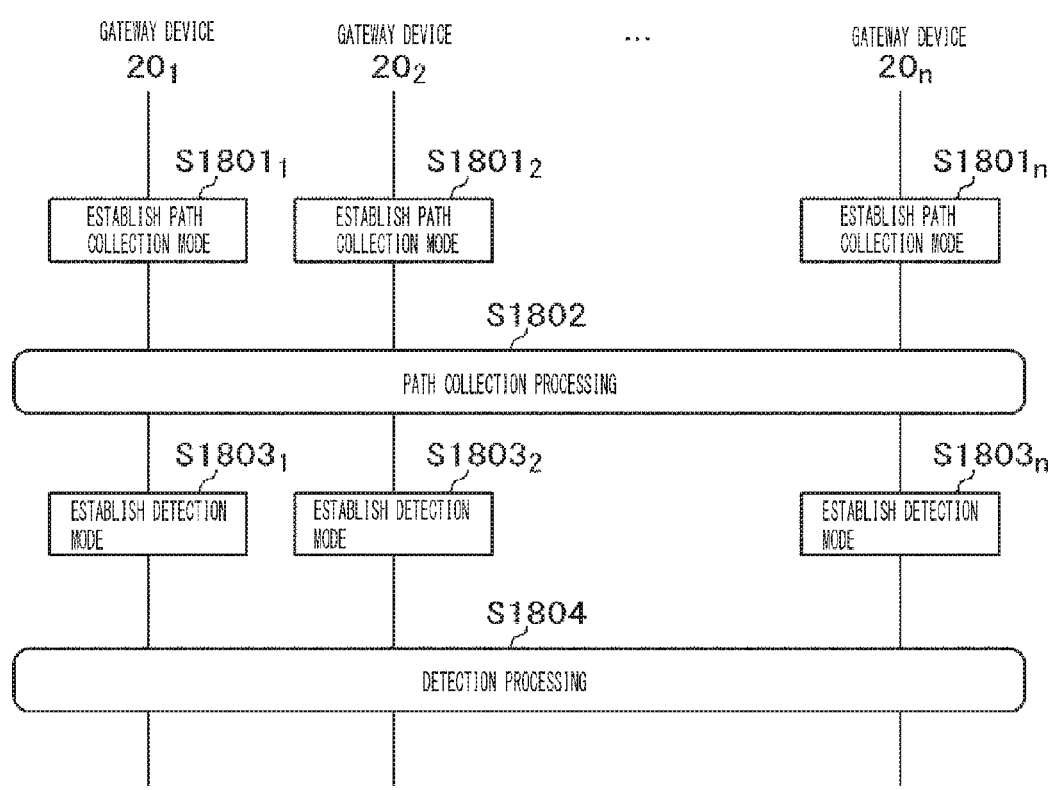
FIG. 18 is a drawing illustrating an example of a flow of processing carried out in an incident detection system to which the second embodiment of the present invention is applied during a trial run or during operation.

FIG. 18 illustrates a flow of processing carried out in an incident detection system to which the second embodiment of the present invention is applied during a trial run or during operation.

First, in a trial run, the mode change unit $204_1$ to $204_n$ of each gateway device $20_1$ to $20_n$ sets the operation mode to a path collection mode ($S1801_1$ to $S1801_n$).

Subsequently, the assumed path extraction units $210_1$ to $210_n$ perform path collection processing (S1802) between the gateway device $20_1$ to $20_n$. The details of path collection processing will be described with reference to FIG. 19.

After the completion of path collection processing, during operation, the mode change unit $204_1$ to $204_n$ of each gateway device $20_1$ to $20_n$ sets the operation mode to a detection mode ($S1803_1$ to $S1803_n$).

Subsequently, the incident detection units $209_1$ to $209_n$ perform detection processing between the gateway devices $20_1$ to $20_n$ (S1804). The details of detection processing will be described with reference to FIG. 20.

Figure 19:
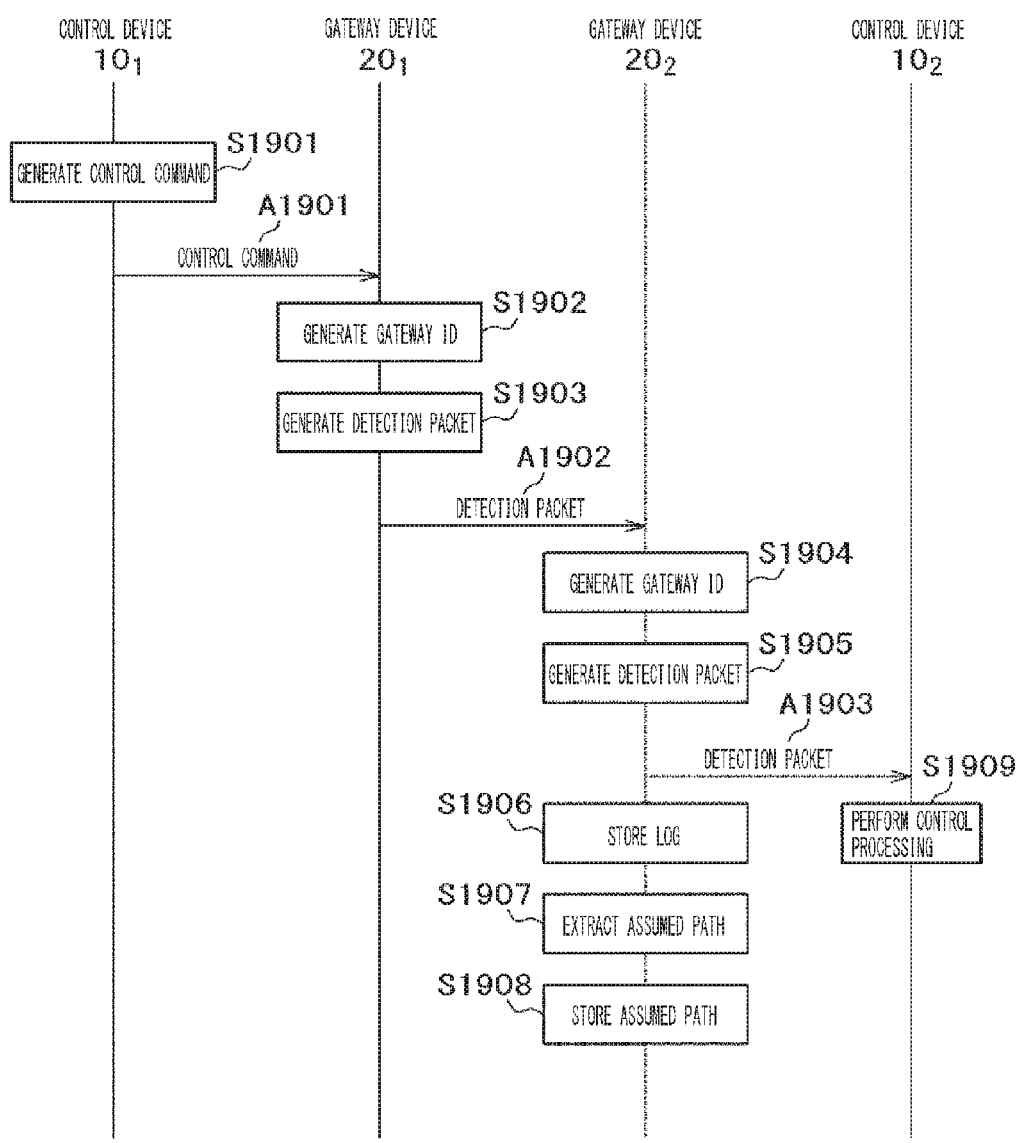
FIG. 19 is a drawing illustrating an example of a flow of processing to collect the path information of authorized communication packets carried out by each gateway device during a trial run in an incident detection system to which the second embodiment of the present invention is applied.

FIG. 19 illustrates a flow of processing to collect the path information of authorized communication packets at each gateway device during a trial run in an incident detection system to which the second embodiment of the present invention is applied. In this exemplary flow, a control command is transmitted from the control device $10_1$ as an origin of control to the control device $10_2$ as a target of control.

First, the control processing unit $101_1$ of the control device $10_1$ generates a control command (S1901). Subsequently, the communication unit $102_1$ transmits the generated control command (A1901) to the gateway device $20_1$.

Subsequently, the first communication unit $205_1$ of the gateway device $20_1$ connected to the communication unit $102_1$ of the control device $10_1$ receives the control command (A1901) transmitted from the control device $10_1$. Subsequently, the ID generation unit $201_1$ of the gateway device $20_1$ generates identification information of the gateway device $20_1$ as its own gateway device (S1902). This identification information can be generated by the same method as at S702. Subsequently, the detection packet generation unit $202_2$ adds a generated gateway ID to the received control command each time to generate the detection packet (A1902) shown in FIG. 12(S1903). Subsequently, the second communication unit $208_1$ transmits the generated detection packet (A1902) to the gateway device $20_2$.

Subsequently, the second communication unit $208_2$ of the gateway device $20_2$ connected to the communication unit $102_2$ of the control device $10_2$ receives the detection packet (A1902) addressed to the control device $10_2$. Subsequently, the ID generation unit $201_2$ of the gateway device $20_2$ generates identification information of the gateway device 202 as its own gateway device (S1904). This identification information can be generated by the same method as at S702. Subsequently, the detection packet generation unit $202_2$ adds the generated gateway ID to the received control command each time to generate the detection packet (A1903) shown in FIG. 12 (S1905). Subsequently, the first communication unit $205_2$ transmits the generated detection packet (A1903) to the control device $10_2$. Subsequently, the log generation unit $203_2$ stores the generated detection packet as log information (S1906). Subsequently, the assumed path extraction unit $210_2$ extracts an assumed path as correct path information from the log information (S1907). Subsequently, the extracted assumed path is stored (S1908).

Subsequently, the control processing unit $101_2$ of the control device $10_2$ performs control processing based on the received detection packet (A 1903) (S1909).

Figure 20:
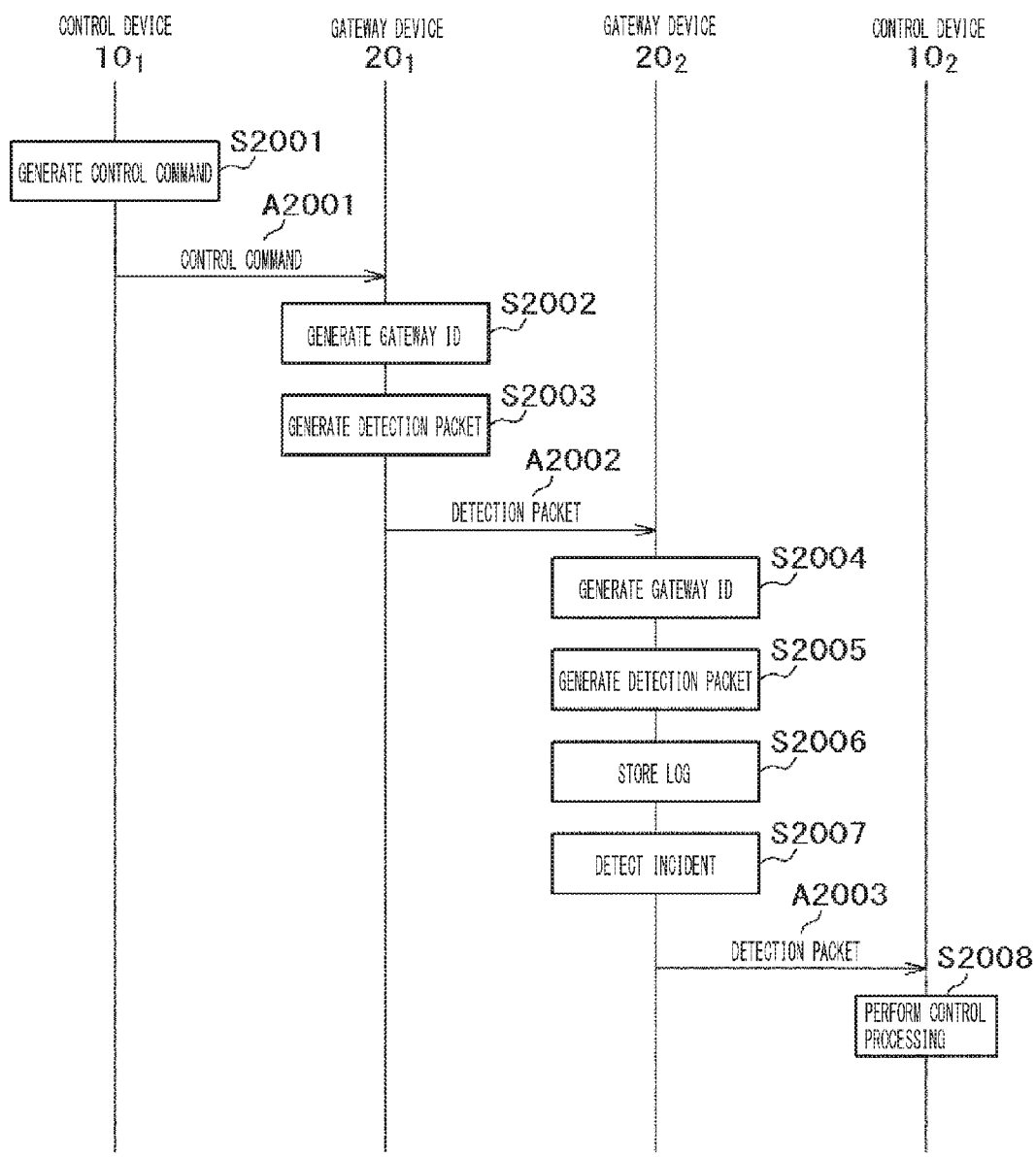
FIG. 20 is a drawing illustrating an example of a flow of processing to detect any unauthorized communication packet from the path information of communication packets collected by each gateway device during operation in an incident detection system to which the second embodiment of the present invention is applied.

FIG. 20 illustrates a flow of processing to detect an unauthorized communication packet at each gateway device during operation in an incident detection system to which the second embodiment of the present invention is applied. The illustration is presented as an example of a security incident. In this exemplary flow, a control command is transmitted from the control device $10_1$ as an origin of control to the control device $10_2$ as a target of control. Each processing of S2001 to S2005 is the same as the processing of S1901 to S1905 shown in FIG. 19 except processing execution timing. Therefore, the description thereof will be hereafter omitted and each processing of S2005 and the following steps will be described.

At S2005, a generated gateway ID is added to the received control command each time to generate the detection packet (A2003) shown in FIG. 12 Subsequently, the log generation unit $203_2$ stores the detection packet as log information (S2006). Subsequently, the incident detection unit $209_2$ performs the incident detection shown in FIG. 9 based on the stored log information. When an alert is generated as the result of detection of an incident, that alert is outputted to a display device, such as a display, connected to the gateway device $20_2$. When an alert has not been generated, the detection packet (A2003) is transmitted to the control device $10_2$ (S2007). In a case where an alert has been generated, the detection packet may be discarded and the processing may be terminated with the influence of unauthorized communication on the system taken into account.

Subsequently, the control processing unit $101_2$ of the control device $10_2$ performs control processing based on the received detection packet (A2003) (S2008).

Any unauthorized communication can be detected without imposing a processing load on a control device by implementing the above-mentioned configurations, procedures, and data structures. That is, a gateway is provided to add communication path information to packets passing through the system and correct path information and the path information of a communication packet are compared with each other. Any unauthorized communication packet can be thereby detected. A more specific description will be given. At a gateway device in the system, the identification information of passed gate ways is sequentially added to passing communication packets and is accumulated as log information at each gateway device. The accumulated log information is complied at a management server or a gateway device. The path information of authorized packets collected during a trial run in advance and path information in the accumulated log information are compared with each other. A packet that passed through an unauthorized communication path can be thereby detected.

The present invention is not limited to the above-mentioned embodiments and may be variously modified without departing from the sprit and scope of the invention.

For example, a control device may be provided with functions of a gateway device. Or, a control device or a gateway device may be not provided with a function of communication with network and communication with a network may be conducted through any other device. Also in these cases, the same functions as mentioned above can be implemented in processing carried out even in the entire system. For example, in the second embodiment, one gateway device may be used as a master device. The gateway device may be then caused to function similarly to the management server 30 in the first embodiment. After the initialization processing shown in FIG. 6 is thereby performed, path collection processing or detection processing may be performed.

REFERENCE SIGNS LIST $10_1$ to $10_n$: Control device,
11: Communication device,
12: Input/output device,
13: Storage device,
14: CPU,
15: Memory,
16: Internal signal line,
$101_1$ to $101_n$: Control processing unit,
$102_1$ to $102_n$: Communication unit,
$20_1$ to $20_n$: Gateway device,
21: First communication device,
22: Input/output device,
23: Storage device,
24: Second communication device,
25: CPU,
26: Memory,
27: Internal signal line,
$201_1$ to $201_n$: ID generation unit,
$202_1$ to $202_n$: Detection packet generation unit,
$203_1$ to $203_n$: Log generation unit,
$204_1$ to $204_n$: Mode change unit,
$205_1$ to $205_n$: First communication unit,
$206_1$ to $206_n$: Log storage unit,
$207_1$ to $207_n$: Secret information storage unit,
$208_1$ to $208_n$: Second communication unit,
$209_1$ to $209_n$: Incident detection unit,
$210_1$ to $210_n$: Assumed path extraction unit,
$211_1$ to $211_n$: Assumed path storage unit,
30: Management server,
31: Communication device,
32: Input/output device,
33: Storage device,
34: CPU,
35: Memory,
36: Reading device,
37: Storage medium,
38: Internal signal line,
301: Mode change unit,
302: Incident detection unit,
303: Secret information generation unit,
304: Log collection unit,
305: Communication unit,
306: Assumed path extraction unit,
307: Assumed path storage unit,
308: Integrated log storage unit,
309: Secret information storage unit,
310: Gateway list storage unit,
40: Network,
A501: Initialization mode notification,
A601: Secret information,
A602: Response and gateway device ID,
A701: Control command,
A702: Detection packet,
A703: Detection packet,
A704: Log information,
A801: Control command, A802: Detection packet,
A803: Detection packet,
A804: Log information,
A1001: Secret information,
A1002: Response and gateway device ID,
A1101: Status confirmation command,
A1102: Status,
A1201: Detection packet,
A1202: Header,
A1203: Data,
A1204: Source address,
A1205: Destination address,
A1206: Protocol,
A1207: Port number,
A1208: Path information,
A1301: Path information,
$A1302_1$ to $A1302_n$: Gateway ID,
A1401: Log,
A1402: Date and time,
A1403: Header,
A1404: Source address,
A1405: Destination address,
A1406: Protocol,
A1407: Port number,
A1408: Path information,
A1501: Integrated log,
A1502: Gateway ID,
A1503: Date and time,
A1504: Header,
A1505: Source address,
A1506: Destination address,
A1507: Protocol,
A1508: Port number,
A1509: Path information,
A1601: Assumed path,
A1602: Source address,
A1603: Destination address,
A1604: Number of passed gateways,
A1605: Passed gateway ID,
$A1606_1$ to $A1606_n$: Gateway ID,
A1701: Gateway list,
A1702: Gateway ID,
A1703: IP address,
A2001: Control command,
A2002: Detection packet,
A2003: Detection packet,
A2101: Control command,
A2102: Detection packet,
A2103: Detection packet.

The invention claimed is:

1. An incident detection system detecting any security incident,
wherein a gateway device includes:
an ID generation unit that generates its own gateway device identification information;
a detection packet generation unit that generates a detection packet including control information transmitted from a control device and path information obtained by adding the own gateway device identification information to a communication packet;
a log generation unit that generates log information including the detection packet; and
a device communication unit that transmits the log information to a management server connected to the gateway device over a network or transmits the detection packet to a control device controlled based on the control information, and wherein the management server includes:
a server communication unit that receives the log information from the gateway device;
a communication path extraction unit that stores assumed path information, obtained by extracting the path information from the log information, in a storage unit in advance; and
an incident detection unit that detects any unauthorized communication packet based on the assumed path information stored in the storage unit and the path information included in the log information;
wherein the gateway device further includes a secret information storage unit for storing secret information,
wherein the ID generation unit generates the own gateway device identification information based on identification information specific to the gateway device and the secret information,
wherein the gateway device further includes a device mode change unit that sets the operation mode of the gateway device to any of an initialization mode, a mode for preparation for processing, a path collection mode, a mode for collecting the assumed path information, and a detection mode, a mode for detecting the path information,
wherein the management server further includes:
a server mode change unit that sets the operation mode of the management server to any of the initialization mode, the path collection mode, and the detection mode; and
a secret information generation unit that generates the secret information,
wherein the secret information generation unit generates the secret information when the gateway device and the management server are in the initialization mode.

2. The incident detection system according to claim 1,
wherein the ID generation unit stores the secret information received from the management server in the secret information storage unit,
wherein the server communication unit transmits the generated secret information to the gateway device,
wherein the communication path extraction unit extracts the assumed path information when the gateway device and the management server are in the path collection mode, and
wherein the incident detection unit detects the unauthorized communication packet when the gateway device and the management server are in the detection mode.

3. The incident detection system according to claim 2,
wherein the secret information generation unit recognizes a gateway device removed from the incident detection system based on response information to a status confirmation command to confirm the status of the gateway device, deletes assumed path information including identification information of the removed gateway device from the assumed path information, and deletes identification information of the removed gateway device from the gateway list.

4. The incident detection system according to claim 1,
wherein the management server further includes a gateway list storage unit for storing a list of the gateway device, and
wherein when a new gateway device is added, the secret information generation unit transmits the secret information to the new gateway device and adds identification information of the new gateway device to the list.

5. The incident detection system according to claim 1,
wherein the detection packet includes a header part and a data part, and
wherein the detection packet generation unit includes the path information in the header part to generate the detection packet.

6. The incident detection system according to claim 1,
wherein each time the communication packet passes, the detection packet generation unit adds the own gateway device identification information to the path information in the order of passage through the gateway device.

7. The incident detection system according to claim 1,
wherein the communication path extraction unit constructs the assumed path information from identification information of a gateway device through which the authorized communication packet passes.

8. The incident detection system according to claim 1,
wherein the communication path extraction unit stores the assumed path information in the storage unit before commissioning of the incident detection system, and
wherein the incident detection unit detects any unauthorized communication packet based on the assumed path information and the path information after commissioning of the incident detection system.

9. An incident detection system detecting any security incident,
wherein a first gateway device includes:
an ID generation unit that generates its own gateway device identification information;
a detection packet generation unit that generates a detection packet including control information transmitted from a control device and path information obtained by adding the own gateway device identification information to a communication packet; and
a first device communication unit that transmits the detection packet to a second gateway device connected to the first gateway device over a network, and
wherein the second gateway device includes:
a second device communication unit that receives the detection packet from the first gateway device or transmits the detection packet to a control device controlled based on the control information;
a log generation unit that stores the detection packet as log information in a storage unit;
a communication path extraction unit that stores assumed path information, obtained by extracting the path information from the log information, in a storage unit in advance; and
an incident detection unit that detects any unauthorized communication packet based on the assumed path information stored in the storage unit and the path information included in the log information;
wherein the first gateway device further includes a secret information storage unit for storing secret information,
wherein the ID generation unit generates the own gateway device identification information based on identification information specific to the first gateway device and the secret information,
wherein the first gateway device further includes a first device mode change unit that sets the operation mode of the first gateway device to either of a path collection mode for collecting the assumed path information and a detection mode, a mode for detecting the path information, and
wherein the second gateway device further includes a second device mode change unit that sets the operation mode of the first gateway device to any of the initialization mode, the path collection mode and the detection mode, and a secret information generation unit that generates the secret information,
wherein the secret information generation unit generates the secret information when the first gateway device and the second gateway device are in the initialization mode.

10. The incident detection system according to claim 9,
wherein the communication path extraction unit extracts the assumed path information when the gateway device and the management server are in the path collection mode, and
wherein the incident detection unit detects the unauthorized communication packet when the gateway device and the management server are in the detection mode.

11. The incident detection system according to claim 9,
wherein the incident detection unit determines whether the security incident has been detected and discards the detection packet when it is determined that the security incident has been detected.

12. The incident detection system according to claim 9,
wherein the communication path extraction unit stores the assumed path information in the storage unit before commissioning of the incident detection system, and
wherein the incident detection unit detects any unauthorized communication packet based on the assumed path information and the path information after commissioning of the incident detection system.

* * * * *